(12) United States Patent
Antkowiak et al.

(10) Patent No.: US 9,269,220 B2
(45) Date of Patent: Feb. 23, 2016

(54) WEB PAGE CONSTRUCTIONS WITH DIFFERENT TECHNOLOGY CONTAINERS

(71) Applicant: WMS Gaming, Inc., Waukegan, IL (US)

(72) Inventors: Ryan D. Antkowiak, Chicago, IL (US);
Daniel J. Gazdic, Chicago, IL (US);
Damon E. Gura, Chicago, IL (US);
Budyanto Himawan, Palatine, IL (US);
Audrey F. Y. Ho, Chicago, IL (US);
Jeffrey M. Leverenz, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/106,310

(22) Filed: Dec. 13, 2013

(65) Prior Publication Data

US 2014/0101537 A1    Apr. 10, 2014

Related U.S. Application Data

(62) Division of application No. 13/581,722, filed as application No. PCT/US2011/046860 on Aug. 5, 2011, now Pat. No. 8,911,294.

(60) Provisional application No. 61/371,276, filed on Aug. 6, 2010.

(51) Int. Cl.
*A63F 9/24* (2006.01)
*G07F 17/32* (2006.01)
(Continued)

(52) U.S. Cl.
CPC ........ *G07F 17/3211* (2013.01); *G06F 17/2247* (2013.01); *G06F 17/30861* (2013.01)

(58) Field of Classification Search
USPC .................................... 463/31; 709/227, 225
See application file for complete search history.

(56) References Cited

U.S. PATENT DOCUMENTS

| 5,129,652 A | 7/1992 | Wilkinson |
| 5,401,018 A | 3/1995 | Kelly et al. |

(Continued)

FOREIGN PATENT DOCUMENTS

| EP | 1799318 | 3/2006 |
| JP | 2005185425 | 7/2005 |

(Continued)

OTHER PUBLICATIONS

"U.S. Appl. No. 13/295,056 Final Office Action", May 21, 2014, 16 Pages.

(Continued)

*Primary Examiner* — Reginald Renwick
(74) *Attorney, Agent, or Firm* — DeLizio Law, PLLC

(57) ABSTRACT

Wagering game systems can leverage web browsers to present wagering game content with a variety of technologies. For instance, an electronic wagering game table can present diverse wagering game content (e.g., multiple wagering games, portal games, social networking applets, hospitality menus, etc.) with a variety of technologies that interface with a web browser. Also, a single wagering game can be constructed from multiple technologies. A wagering game system can implement a framework that dynamically builds up a web page to use multiple technologies for presenting content with a web browser on a wagering game system. The framework can dynamically construct the web page, which can involve modifying objects, embedding objects, removing objects, and replacing objects that correspond to different technologies.

20 Claims, 7 Drawing Sheets

(51) Int. Cl.
  *G06F 17/30* (2006.01)
  *G06F 17/22* (2006.01)

(56) References Cited

U.S. PATENT DOCUMENTS

| | | |
|---|---|---|
| 5,618,232 A | 4/1997 | Martin |
| 5,890,962 A | 4/1999 | Takemoto |
| 5,941,772 A | 8/1999 | Paige et al. |
| 6,001,016 A | 12/1999 | Walker et al. |
| 6,129,632 A | 10/2000 | Luciano |
| 6,270,410 B1 | 8/2001 | Demar et al. |
| 6,311,976 B1 | 11/2001 | Yoseloff et al. |
| 6,375,567 B1 | 4/2002 | Acres |
| 6,443,837 B1 | 9/2002 | Jaffe et al. |
| 6,476,830 B1 | 11/2002 | Farmer et al. |
| 6,508,709 B1 | 1/2003 | Karmarkar |
| 6,592,460 B2 | 7/2003 | Laerence |
| 6,606,659 B1 | 8/2003 | Hegli et al. |
| 6,790,142 B2 | 9/2004 | Okada et al. |
| 6,860,810 B2 | 3/2005 | Cannon et al. |
| 6,863,608 B1 | 3/2005 | LeMay et al. |
| 6,887,157 B2 | 5/2005 | LeMay et al. |
| 6,913,532 B2 | 7/2005 | Baerlocher et al. |
| 7,090,576 B2 | 8/2006 | Herbrich et al. |
| 7,160,187 B2 | 1/2007 | Loose et al. |
| 7,484,176 B2 | 1/2009 | Blattner et al. |
| 7,636,755 B2 | 12/2009 | Blattner et al. |
| 7,753,770 B2 | 7/2010 | Walker et al. |
| 7,867,083 B2 | 1/2011 | Wells et al. |
| 7,883,413 B2 | 2/2011 | Paulsen |
| 7,918,738 B2 | 4/2011 | Paulsen |
| 7,946,922 B2 | 5/2011 | Yin |
| 8,241,116 B2 | 8/2012 | Ocko et al. |
| 8,539,073 B1 * | 9/2013 | Dayan ........................ 709/225 |
| 2002/0042740 A1 | 4/2002 | Matsuoka |
| 2002/0049814 A1 | 4/2002 | Yoo |
| 2002/0094869 A1 | 7/2002 | Harkham |
| 2002/0183105 A1 | 12/2002 | Cannon et al. |
| 2003/0073494 A1 | 4/2003 | Kalpakian et al. |
| 2003/0083943 A1 | 5/2003 | Adams et al. |
| 2003/0188306 A1 | 10/2003 | Harris et al. |
| 2003/0199313 A1 | 10/2003 | Gonen |
| 2003/0224852 A1 | 12/2003 | Walker et al. |
| 2004/0242322 A1 | 12/2004 | Montagna et al. |
| 2005/0020358 A1 | 1/2005 | Cram |
| 2005/0026670 A1 | 2/2005 | Lardie |
| 2005/0037845 A1 | 2/2005 | Rozkin et al. |
| 2005/0054441 A1 | 3/2005 | Landrum et al. |
| 2005/0130728 A1 | 6/2005 | Nguyen et al. |
| 2005/0130737 A1 | 6/2005 | Englman et al. |
| 2005/0137015 A1 | 6/2005 | Rogers et al. |
| 2005/0148383 A1 | 7/2005 | Mayeroff |
| 2005/0159207 A1 | 7/2005 | Thomas |
| 2005/0227811 A1 | 10/2005 | Shum et al. |
| 2005/0239546 A1 | 10/2005 | Hedrick et al. |
| 2006/0073887 A1 | 4/2006 | Nguyen et al. |
| 2006/0073888 A1 | 4/2006 | Nguyen et al. |
| 2006/0100009 A1 | 5/2006 | Walker et al. |
| 2006/0111172 A1 | 5/2006 | Walker et al. |
| 2006/0172794 A1 | 8/2006 | Walker et al. |
| 2006/0189371 A1 | 8/2006 | Walker et al. |
| 2006/0194633 A1 | 8/2006 | Paulsen |
| 2006/0217199 A1 | 9/2006 | Adcox et al. |
| 2006/0240894 A1 | 10/2006 | Andrews |
| 2006/0252530 A1 | 11/2006 | Oberberger et al. |
| 2006/0287074 A1 | 12/2006 | Walker et al. |
| 2006/0287111 A1 | 12/2006 | Mitchell et al. |
| 2007/0060330 A1 | 3/2007 | Martin |
| 2007/0060346 A1 * | 3/2007 | Edwards ........................ 463/31 |
| 2007/0077978 A1 | 4/2007 | Walker et al. |
| 2007/0093299 A1 | 4/2007 | Bergeron et al. |
| 2007/0111787 A1 | 5/2007 | Adams et al. |
| 2007/0122778 A1 | 5/2007 | Beitel et al. |
| 2007/0178955 A1 | 8/2007 | Mills |
| 2007/0197296 A1 | 8/2007 | Lee |
| 2007/0243925 A1 | 10/2007 | LeMay et al. |
| 2007/0259713 A1 | 11/2007 | Fiden et al. |
| 2008/0020788 A1 | 1/2008 | Griswold et al. |
| 2008/0026838 A1 | 1/2008 | Dunstan et al. |
| 2008/0070669 A1 | 3/2008 | Walker et al. |
| 2008/0076548 A1 | 3/2008 | Paulsen |
| 2008/0132331 A1 | 6/2008 | Gatto et al. |
| 2008/0139306 A1 | 6/2008 | Lutnick et al. |
| 2008/0155006 A1 | 6/2008 | Franklin et al. |
| 2008/0167106 A1 | 7/2008 | Lutnick et al. |
| 2008/0171602 A1 | 7/2008 | Patel et al. |
| 2008/0181535 A1 | 7/2008 | Steiger |
| 2008/0188285 A1 | 8/2008 | Roelofs |
| 2008/0248844 A1 | 10/2008 | Gadda et al. |
| 2009/0023489 A1 | 1/2009 | Toneguzzo |
| 2009/0044113 A1 | 2/2009 | Jones et al. |
| 2009/0062017 A1 | 3/2009 | Kelly et al. |
| 2009/0070379 A1 | 3/2009 | Rappaport |
| 2009/0082090 A1 | 3/2009 | Walker et al. |
| 2009/0093309 A9 | 4/2009 | Patel et al. |
| 2009/0124384 A1 | 5/2009 | Smith et al. |
| 2009/0124386 A1 | 5/2009 | LaMontagne |
| 2009/0156179 A1 | 6/2009 | Hahn et al. |
| 2009/0157693 A1 | 6/2009 | Palahnuk |
| 2009/0158170 A1 | 6/2009 | Narayanan et al. |
| 2009/0209350 A1 | 8/2009 | Kelly et al. |
| 2009/0280891 A1 | 11/2009 | Filipour et al. |
| 2009/0286585 A1 | 11/2009 | Walker |
| 2009/0319058 A1 | 12/2009 | Rovaglio et al. |
| 2010/0009743 A1 | 1/2010 | Amaitis et al. |
| 2010/0077321 A1 | 3/2010 | Shen et al. |
| 2010/0121915 A1 | 5/2010 | Wang |
| 2010/0124967 A1 | 5/2010 | Lutnick et al. |
| 2010/0125732 A1 | 5/2010 | Cha et al. |
| 2010/0137067 A1 | 6/2010 | Kobayashi et al. |
| 2010/0199160 A1 | 8/2010 | Klassen et al. |
| 2010/0210345 A1 | 8/2010 | Berman et al. |
| 2010/0210353 A1 | 8/2010 | Gagner et al. |
| 2010/0217686 A1 | 8/2010 | Craig et al. |
| 2010/0222134 A1 | 9/2010 | Gagner et al. |
| 2010/0227662 A1 | 9/2010 | Speer et al. |
| 2010/0227682 A1 | 9/2010 | Reville et al. |
| 2010/0261517 A1 | 10/2010 | Gomez et al. |
| 2010/0287070 A1 | 11/2010 | Santeufemia et al. |
| 2010/0304848 A1 | 12/2010 | Detlefsen et al. |
| 2011/0009188 A1 | 1/2011 | Adiraju et al. |
| 2011/0014975 A1 | 1/2011 | Grabiec et al. |
| 2011/0028203 A1 | 2/2011 | Agarwal et al. |
| 2011/0053672 A1 | 3/2011 | Gagner et al. |
| 2011/0107241 A1 | 5/2011 | Moore |
| 2011/0122870 A1 | 5/2011 | Dixon et al. |
| 2011/0143834 A1 | 6/2011 | Guinn et al. |
| 2011/0190066 A1 | 8/2011 | Barclay et al. |
| 2011/0201414 A1 | 8/2011 | Barclay et al. |
| 2011/0207525 A1 | 8/2011 | Allen et al. |
| 2011/0263318 A1 | 10/2011 | Agarwal et al. |
| 2011/0312410 A1 | 12/2011 | Aoki et al. |
| 2012/0157193 A1 | 6/2012 | Arezina et al. |
| 2012/0277005 A1 | 11/2012 | Blackburn et al. |
| 2012/0322550 A1 | 12/2012 | Antkowiak et al. |
| 2013/0130806 A1 | 5/2013 | Gagner et al. |
| 2013/0244767 A1 | 9/2013 | Barclay et al. |
| 2014/0106881 A1 | 4/2014 | Antkowiak et al. |
| 2014/0162783 A1 | 6/2014 | Frattinger et al. |

FOREIGN PATENT DOCUMENTS

| | | |
|---|---|---|
| KR | 1020000024559 | 5/2000 |
| KR | 1020000036733 | 7/2000 |
| KR | 1020000036734 | 7/2000 |
| KR | 1020010096297 | 11/2001 |
| KR | 1020020011293 | 4/2002 |
| KR | 1020030088840 | 6/2005 |
| WO | WO-2006033986 | 3/2006 |
| WO | WO-2006039306 | 4/2006 |
| WO | WO-2006105182 | 10/2006 |
| WO | WO-2007006002 | 1/2007 |
| WO | WO-2007055774 | 5/2007 |
| WO | WO-2008021051 | 2/2008 |

(56) References Cited

FOREIGN PATENT DOCUMENTS

| | | |
|---|---|---|
| WO | WO-2009007701 | 1/2009 |
| WO | WO-2009026305 | 2/2009 |
| WO | WO-2009026307 | 2/2009 |
| WO | WO-2009026308 | 2/2009 |
| WO | WO-2009026309 | 2/2009 |
| WO | WO-2009045972 | 4/2009 |
| WO | WO-2009114183 | 9/2009 |
| WO | WO-2010028064 | 3/2010 |
| WO | WO-2010042773 | 4/2010 |
| WO | WO-2010056924 | 5/2010 |
| WO | WO-2012019167 | 2/2012 |

OTHER PUBLICATIONS

U.S. Appl. No. 12/968,269, filed Dec. 14, 2010, Guinn, Andrew C., et al.
U.S. Appl. No. 13/295,056, filed Nov. 12, 2011, Allen, Jeffrey L., et al.
U.S. Appl. No. 13/116,726, filed May 26, 2011, Frattinger, Christopher J., et al.
U.S. Appl. No. 13/204,203, filed Aug. 5, 2011, Antkowiak, Ryan D., et al.
U.S. Appl. No. 13/204,269, filed Aug. 5, 2011, Antkowiak, Ryan D., et al.
U.S. Appl. No. 13/741,871, filed Jan. 15, 2013, Gagner, Mark B., et al.
U.S. Appl. No. 13/890,080, filed May 8, 2013, Barclay, Brian J., et al.
U.S. Appl. No. 14/106,415, filed Dec. 13, 2013, Antkowiak, Ryan D., et al.
"Casino City of Facebook", YouTube http://www.youtube.com/watch?v=3SixXXiFWb4 Date Obtained from the Internet: Apr. 25, 2013 Nov. 2, 2010 , 2 pages.
"Doubledown Casino Facebook Gameplay Preview", YouTube http://www.youtube.com/watch?v=1EGB_LGPGec Date Obtained from the Internet: Apr. 25, 2013 Nov. 12, 2011 , 2 pages.
"Golden Nugget Vegas Casino—Facebook Game", YouTube http://www.youtube.com/watch?v=1XhVPye4N2I Date Obtained from the Internet: Apr. 25, 2013 Aug. 13, 2010 , 2 pages.
"Leapfrog Online Bingo Software Review", garysmomsbingopage.com http://www.garysmomsbingopage.com/leapfrog.htm Last date modified: Jul. 17, 2008 , 1-2 pages.
"PCT Application No. PCT/US08/78199 International Preliminary Report on Patentability", Sep. 14, 2010 , 4 pages.
"PCT Application No. PCT/US08/78199 International Search Report", Dec. 8, 2008 , 9 pages.
"PCT Application No. PCT/US08/80051 International Preliminary Report on Patentability", Nov. 19, 2009 , 9 pages.
"PCT Application No. PCT/US08/80051 International Search Report", Dec. 12, 2008 , 10 pages.
"PCT Application No. PCT/US09/60075 International Preliminary Report on Patentability", Sep. 20, 2010 , 4 pages.
"PCT Application No. PCT/US09/60075 International Search Report", Jan. 26, 2010 , 10 pages.
"PCT Application No. PCT/US11/46860 International Preliminary Report on Patentability", Aug. 6, 2012 , 4 pages.
"PCT Application No. PCT/US11/46860 International Search Report", Jan. 5, 2012 , 9 pages.
"U.S. Appl. No. 12/678,194 Office Action", Apr. 19, 2012 , 16 pages.
"U.S. Appl. No. 12/681,985 Final Office Action", Mar. 5, 2012 , 15 pages.
"U.S. Appl. No. 12/681,985 Office Action", Feb. 25, 2013 , 13 pages.
"U.S. Appl. No. 12/681,985 Office Action", Oct. 12, 2011 , 14 pages.
"U.S. Appl. No. 12/968,269 Final Office Action", Jun. 5, 2013 , 17 pages.
"U.S. Appl. No. 12/968,269 Office Action", Feb. 22, 2013 , 15 pages.
"U.S. Appl. No. 12/968,269 Office Action", Nov. 16, 2012 , 31 pages.
"U.S. Appl. No. 13/204,203 Final Office Action", Oct. 5, 2012 , 18 pages.
"U.S. Appl. No. 13/204,203 Office Action", Jul. 5, 2013 , 16 pages.
"U.S. Appl. No. 13/204,203 Office Action", Jun. 21, 2012 , 22 pages.
"U.S. Appl. No. 13/204,269 Final Office Action", Jan. 30, 2013 , 25 pages.
"U.S. Appl. No. 13/204,269 Office Action", Jul. 16, 2012 , 24 pages.
"U.S. Appl. No. 13/295,056 Non Final Office Action", Apr. 1, 2013 , 17 pages.
"U.S. Appl. No. 13/581,722 Office Action", Feb. 6, 2014 , 14 Pages.
"U.S. Appl. No. 13/581,722 Office Action", Jul. 5, 2013 , 26 pages.
Facebook, , "Casino City", http://apps.facebook.com/casinocitygame/?f=bm&ref=canvas_bkmk_top&count=0 Date Obtained from the Internet: Nov. 15, 2010 No Publication Date Found , 3 pages.
Facebook, , "DoubleDown Casino", http://apps.facebook.com/doubledowncasino/?ref=bookmarks&count=0 Date Obtained from the Internet: Nov. 15, 2010 No Publication Date Found , 5 pages.
Facebook, , "Golden Nugget Vegas Casino", http://apps.facebook.com/gncasino/?ref=canvas_bkmk_more&count=0 Date Obtained from the Internet: Nov. 15, 2010 No Publication Date Found , 4 pages.
Lamacraft, Brian , "Facebook Game Review: Casino City", Bright Hub http://www.brighthub.com/video-games/social/reviews/78485.aspx Date Obtained from the Internet: Nov. 16, 2010 Jul. 20, 2010 , 3 pages.
Phantom EFX, , "Reel Deal Live", http://reeldealliveonline.com/pages/about-the-game Date Obtained from the Internet: Nov. 16, 2010 , 3 pages.
"U.S. Appl. No. 13/204,203 Office Action", Apr. 1, 2015, 9 Pages.
"U.S. Appl. No. 13/295,056 Office Action", Apr. 14, 2015, 15 Pages.
"U.S. Appl. No. 13/890,080 Office Action", Jun. 12, 2015, 8 Pages.
U.S. Appl. No. 12/968,269, filed Dec. 14, 2010, Andrew C. Guinn et al.
U.S. Appl. No. 13/295,056, filed Apr. 18, 2013, Jeffrey L. Allen et al.
U.S. Appl. No. 13/116,726, filed May 26, 2011, Christopher J. Frattinger et al.
U.S. Appl. No. 13/741,871, filed Jan. 15, 2013, Mark B. Gagner et al.
U.S. Appl. No. 13/890,080, filed May 8, 2013, Brian J. Barclay et al.
U.S. Appl. No. 14/106,415, filed Dec. 13, 2013, Ryan D. Antkowiak et al.
"U.S. Appl. No. 13/204,269 Final Office Action", Sep. 18, 2015, 14 pages.
"U.S. Appl. No. 14/179,189 Final Office Action", Jul. 29, 2015, 12 Pages.
"U.S. Appl. No. 13/890,080 Final Office Action", Nov. 9, 2015, 12 Pages.
"U.S. Appl. No. 13/295,056 Final Office Action", Dec. 10, 2015, 15 Pages.

* cited by examiner

WEB PAGE CONSTRUCTIONS WITH DIFFERENT TECHNOLOGY CONTAINERS

RELATED APPLICATIONS

This application is a divisional application that claims priority benefit of U.S. application Ser. No. 13/581,722 filed 5 Aug. 2011, which is a National Stage Application of PCT/US11/46860 filed 5 Aug. 2011, which claims priority benefit of Provisional U.S. Application No. 61/371,276 filed 6 Aug. 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game systems, and more particularly to a browser based heterogeneous technology system.

BACKGROUND

A variety of technologies are available for creating interactive web pages. Web pages often include scripts that imbue a web page with functionality beyond that available with hypertext markup language alone. In addition, features/functionalities are added to a web browser with web browser add-ons. Add-ons include themes, extensions, and plug-ins. These allow the appearance of a web browser window to be customized. Extensions typically integrate with logic of a web browser to add functionality to the web browser. Plug-ins also add functionality to a web browser, but remains separate from the web browser. A plug-in and a web browser communicate via an established interface, through which values and/or code are communicated. Further, web browsers aggregate additional technologies (e.g., extensible markup language, cascading style sheets, document object models) with scripts and add-ons for a highly interactive web page.

BRIEF DESCRIPTION OF THE FIGURES

Embodiments of the invention are illustrated in the Figures of the accompanying drawings in which.

DESCRIPTION OF THE EMBODIMENTS

The description that follows includes exemplary systems, methods, techniques, instruction sequences, and computer program products that embody techniques of the present inventive subject matter. However, it is understood that the described embodiments may be practiced without these specific details. For instance, although examples refer to web browsers operating in a client-server model to request resources from remote locations, embodiments are not limited. Embodiments can use resources local to the machine hosting the web browser. In other instances, well-known instruction instances, protocols, structures, and techniques have not been shown in detail in order not to obfuscate the description.

Web browsers have become ubiquitous across machines/devices, and allow technological flexibility with extensions, plug-ins, extensible markup language, etc. Wagering game systems can leverage web browsers to present wagering game content with a variety of technologies. For instance, an electronic wagering game table can present diverse wagering game content (e.g., multiple wagering games, portal games, social networking applets, hospitality menus, etc.) with a variety of technologies that interface with a web browser. Also, a single wagering game can be constructed from multiple technologies. A wagering game system can implement a framework that dynamically builds up a web page to use multiple technologies for presenting content with a web browser on a wagering game system. The framework can dynamically construct the web page, which can involve modifying objects, embedding objects, removing objects, and replacing objects that correspond to different technologies.

Figure 1:
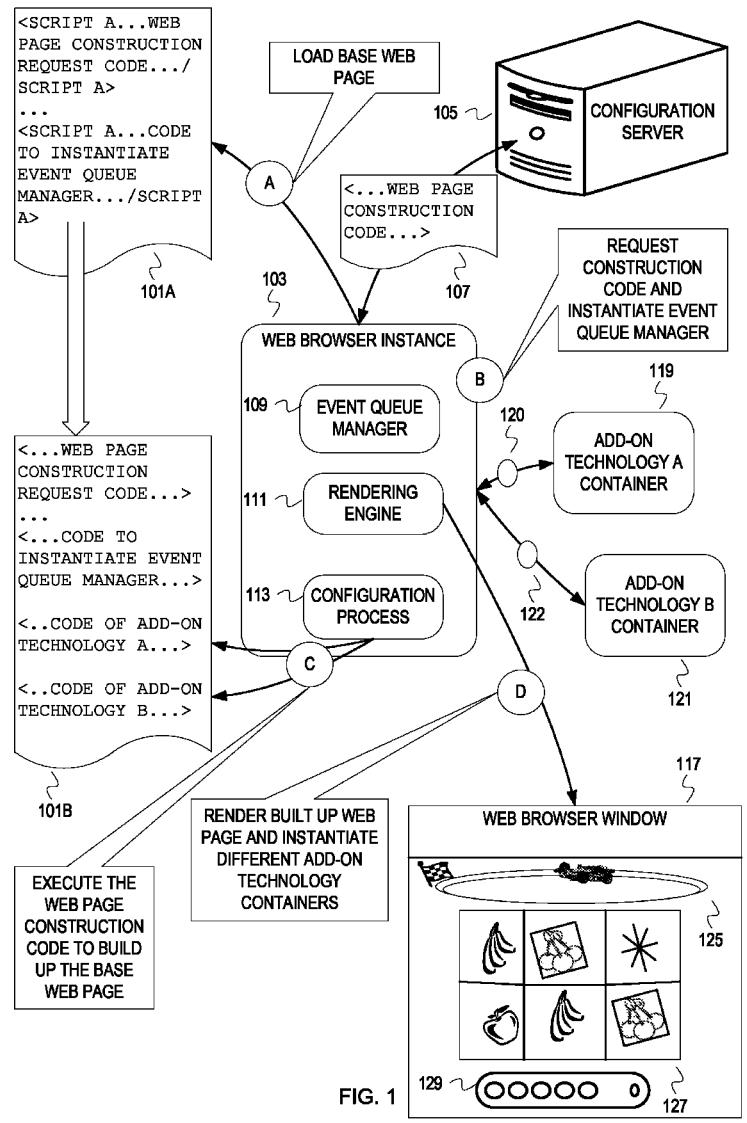
FIG. 1 depicts an example conceptual diagram of a framework for dynamic construction of a web page source to leverage multiple technologies.

FIG. 1 depicts an example conceptual diagram of a framework for dynamic construction of a web page source to leverage multiple technologies. In FIG. 1, a web browser instance 103 is depicted. The web browser instance 103 is an executing instance of a web browser program (e.g., Mozilla's Firefox® web browser, Microsoft's Internet Explorer® web browser, the Opera Software's Opera browser, Apple's Safari® browser). Although not depicted, a machine (e.g., wagering game table, wagering game terminal, portable wagering game machine, mobile phone, etc.) hosts the web browser instance. In FIG. 1, the web browser instance interacts with a configuration server 105. Thus, the machine that hosts the web browser instance 103 communicates over any one of the Internet, a local area network (e.g., a network within wagering game establishment), and a wide area network (e.g., a network that spans multiple wagering game establishments). FIG. 1 depicts several stages (A-D) of operations for the framework to dynamically construct a web page source that presents wagering game content with multiple technologies. Of course, embodiments are not limited to four stages of operations.

At stage A, the web browser instance 103 loads a base web page source 101A. The base web page source may be a hypertext markup file, an extensible markup language file, etc. The base web page source 101A comprises code to request web page construction code and code to instantiate an event queue manager. It is not necessary for the base web page source to comprise the event queue manager instantiation code. Embodiments can implement the event queue manager instantiation code separate from the base web page source (e.g., as part of the web page construction code, incorporated into the web browser program, etc.).

At stage B, the web browser instance 103 requests the web page construction code and instantiates an event queue manager. Responsive to loading of the base web page at stage A, a rendering engine 111 of the web browser instance 103 recognizes a tag for a language. In this example, the rendering engine 111 recognizes a tag for "Script A" in the base web page source 101A. Embodiments are not limited to script languages, though. Any of a variety of programming language can be used. A short list of example rendering engines (also referred to as layout engines) includes Netscape Communications Corporation's Gecko® layout engine, Apple's WebKit layout engine, the Trident layout engine, and the Presto layout engine. The rendering engine 111 processes (e.g., interprets, translates, etc.) the marked up content of the base web page source 101A. After recognizing the programming language tag, the rendering engine 111 invokes a code execution engine, which is not depicted, to execute the embedded web construction request code. A few examples of code execution engines include the Rhino script execution engine, the SpiderMonkey script execution engine, Tamarin script execution engine, V8 script execution engine, the Chakra script execution engine, the Carakan script execution engine. The code execution engine executes the web construction request code to request web construction code 107 from the configuration server 105. The code execution engine also executes the event queue manager instantiation code to instantiate an event queue manager 109.

At stage C, the web browser instance 103 executes the web page construction code to build up the base web page. As a result of the web browser instance 103 (vis-à-vis the cod execution engine) executing the web construction code received from the configuration server 105, a configuration process 113 is spawned in this example. Although it is not necessary for a separate process to be spawned, depicting a separate process is at least helpful for illustrative purposes. Execution of the web page construction code causes the configuration process 113 modify the base web page source 101A. The configuration process 113 embeds tags and code of various technologies in accordance with the web page construction code. FIG. 1 depicts the configuration process 113 adding code for an add-on technology A and code for an add-on technology B to the base web page source 101A, resulting in a web page source 101B. The various add-on technologies may be responsible for presenting different aspects of the web page including video, animation, social networking tools, browser appearance, etc. Examples of the various technologies added to the base web page source include the Flash® multimedia platform, Unity gaming engine, TM HTML5 Video, Microsoft Silverlight, JavaFX, Unity, etc. At this point, the web browser instance 103 may not present anything to a user yet.

At stage D, the rendering engine 111 renders the built up web page and instantiates a program(s) for different add-on technologies ("add-on technology containers") based on the built up web page source 101B. The rendering engine 111 begins to process the built up web page source 101B. As the rendering engine 111 processes the web page source 101B, the rendering engine 111 invokes appropriate programs to execute the code embedded in the built up web page source 101B for the various technologies. In this example, the web page source 101B indicates add-on technology A and add-on technology B. Accordingly, add-on technology A container 119 and add-on technology B container 121 are instantiated. The web browser instance 103 and the add-on technology container A pass code and/or data via an interface 120. The web browser instance 103 and the add-on technology B container 121 pass code and/or data via an interface 122. With the add-on technology containers 119, 121, the web browser instance 103 renders wagering game content in a web browser window 117.

In this depicted example, the rendering engine 111 renders wagering game content that includes a bonus automobile racing game 125, a slot game 127, and a control panel 129. The rendering engine 111 renders the bonus automobile racing game 125 in accordance with animation technology. The rendering engine 111 renders the slot game 127 in accordance with a three-dimensional (3D) game authoring technology. The rendering engine 111 renders the control panel 129 in accordance with an aggregation of technologies (e.g., AJAX, dynamically loaded internal objects in the Unity3D® game development tool, the Silverlight® development platform, etc.). Assuming the add-on technology A container 119 implements animation technology, then the rendering engine 111 renders the animation for the bonus 125 in accordance with output of the add-on technology A container 119. Assuming the add-on technology B container 121 implements a 3D gaming engine, the rendering engine 111 renders the slot game 127 in accordance with output from the add-on technology B container 121. Although a third technology container is not depicted, the rendering engine 111 renders the control panel 129 in accordance with output of a third technology container that corresponds to the aggregation of technologies and output of the rendering engine 111. Hence, in this example, the web browser instance 103 presents wagering game content with multiple different technologies in a single web browser window. Further, multiple technologies can be employed to present different aspects of a single wagering game. For instance, the web browser instance 103 can employ 3D gaming engine technology to present reels of the slot game 127, and employ animation technology to present background of the slot game 127. In another example, the web browser instance employs Silverlight technology to sow a streaming video or content from a video recorder. The web browser instance uses Javascript® technology or HTML5 based technology to tie into social networking sites. And the web browser instance uses Flash technology to provide a menu for a user to select a type of game content.

Figure 2:
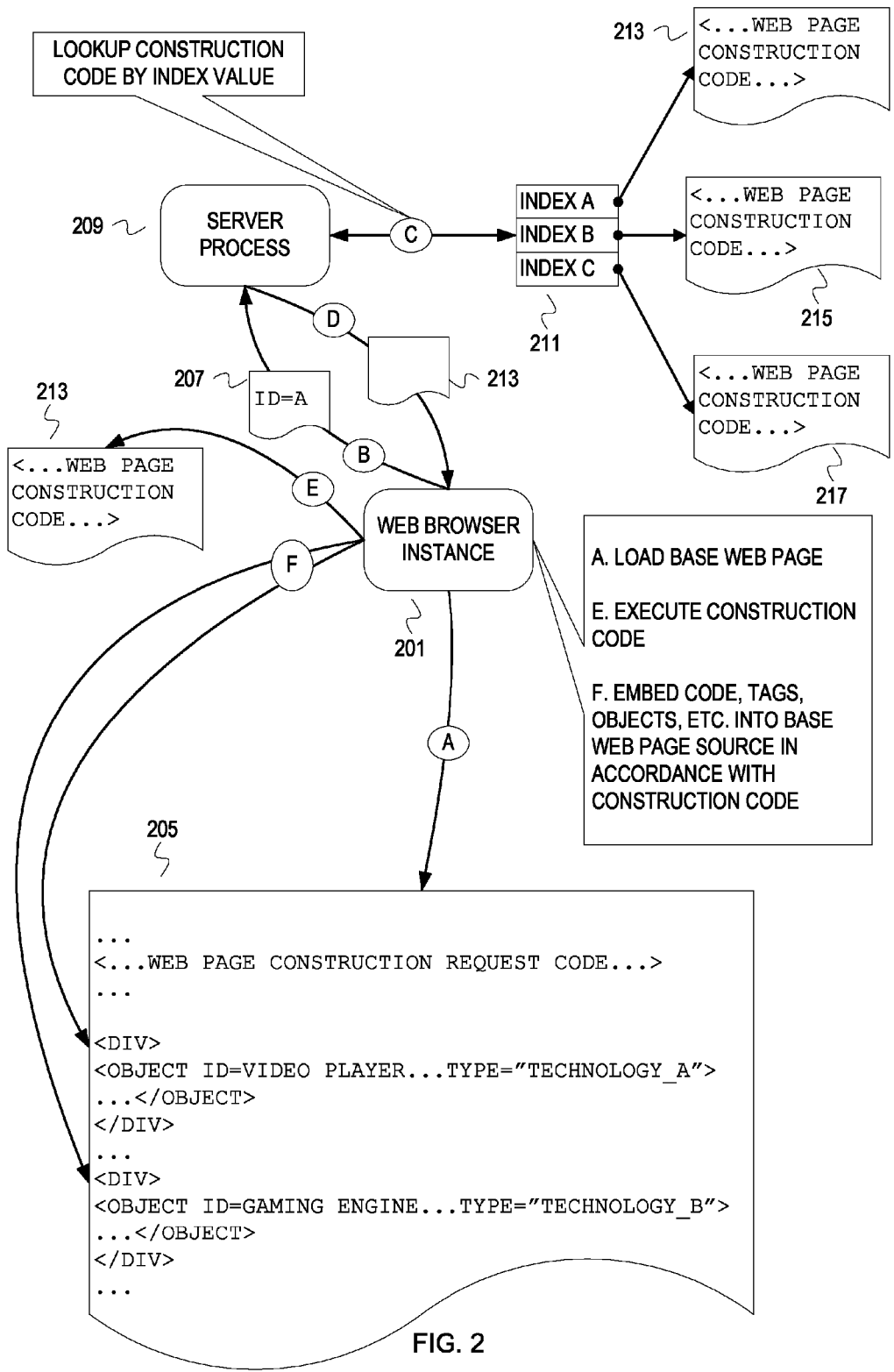
FIG. 2 depicts an example conceptual diagram for selecting a web page construction code based on an index value.

The web page that is eventually presented by a web browser arises from a web page source that evolves from a base web page source modified by execution of the web page construction code retrieved from a server, although the web page construction code could be local and distinct from the base web page source. The web page construction code that is supplied to the web browser instance can be selected from a variety of web page construction code. A store can host different web page construction codes for different machines, locations, wagering games, environments, temporal values, etc. For example, a web page construction code can be selected based on time of year, particular casino, and type of wagering game machine. FIG. 2 depicts one of many ways to select a web page construction code.

FIG. 2 depicts an example conceptual diagram for selecting a web page construction code based on an index value. In this example, a web browser instance 201 (e.g., on a wagering game machine) communicates with a server process 209. The web browser instance 201 has access to a web page source 205. The server process 209 has access to a store of web page construction codes 213, 215, 217, via an index data structure 211.

At stage A, the web browser instance 201 loads the web page source 205, which is a base web page source at this point. Loading of the web page source 205 causes the web browser instance 201 to request web page construction code.

At stage B, the web browser instance 201 generates and transmits a request 207 for the web page construction code. In this example, the request 207 indicates an identifier "A." The identifier can represent any one or more of wagering game, wagering game developer, wagering game machine, owner of the wagering game machine, a license identifier, etc. The identifier can be hard coded into the web page construction code, or determined from execution of the web page construction request code. Execution of the web page construction code can generate a query submitted to an operating system, a lookup in a data store identified in the web page construction request code, etc. Furthermore, the web page construction request code can determine additional variable values that affect web page construction code selection. Examples of other variable values include player identification data, time of day, time of year, eligibility of the wagering game machine in bonus games, web browser version, etc.

At stage C, the server process 209 looks up a web page construction code in accordance with the request 207. For this example, the identifier "A" corresponds to an "Index A" in the index data structure 211. The entry for "Index A" references the web page construction code 213. Although this example illustrates an index lookup, embodiments are not so limited. Embodiments can evaluate rules or conditions against the request to determine which web page construction code should be selected. In addition, embodiments can assemble or build a web page construction code. For instance, an embodiment can select different web page construction codes based on information in the request from the web browser instance. A first web page construction code can construct a control panel for wagering game when executed. A second web page construction code can construct a video for the wagering game when executed. A third web page construction code can construct a hospitality services menu when executed, and so on. The server process 209 can assemble these different web page construction codes into a single executable file.

Returning to the illustrated example, the server process 209 returns the selected web page construction code 213 to the web browser instance 201 at stage D. Embodiments can return the web page construction code 213, or a reference to the web page construction code 213.

At stage E, the web browser instance 201 executes the web page construction code 213. For instance, a TM Javascript interpreter interprets the web page construction code 213.

Pursuant to execution of the web page construction code 213, the web browser instance 201 modifies the web page source 205 at stage F. The web browser instance 201 embeds code, tags, and objects into the web page source 205 in accordance with the web page construction code 213. In this example, the web browser instance 201 inserts a video player object of a technology A, and a gaming engine object of a technology B. Although this example suggests literal embedding, web page construction can involve referential embedding of code or content (e.g., a reference to a file to be presented or executed by an add-on technology container).

A web browser instance can either render a web page as the web page source is augmented or built up, or the web browser instance can wait until the web page source completes construction. When rendering the web page, the web browser instance instantiates or launches technology containers for the different technologies of web page elements in the web page source. The technology containers, sometimes referred to as application containers, hold or execute commands or programs and/or present content of a particular technology, separate from the web browser instance (e.g., an Adobe Flash container presents Flash content). In some embodiments, a container of a first technology can use used to present content of a second technology. For instance, a Unity container can be used to present Flash based content. For brevity, the term "container" is used herein to refer to both a set of instructions (e.g., program) for a container and an executing instance of instructions for a container.

Figure 3:
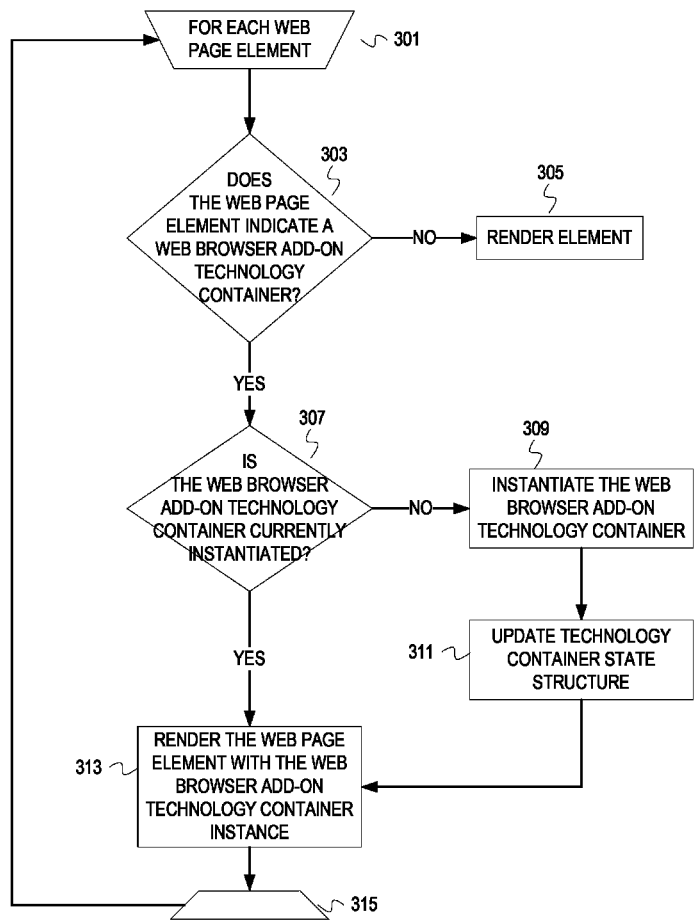
FIG. 3 depicts a flowchart of example operations for rendering a web page from a dynamically built up web page source.

FIG. 3 depicts a flowchart of example operations for rendering a web page from a dynamically built up web page source. At block 301, a loop of operations begins for each web page element or object. Examples of web page elements include applets, images, videos, fields, panels, etc.

At block 303, it is determined if the web page element indicates a web browser add-on technology container. For instance, tag attributes are examined to determine if a particular technology is indicated for the element. If the web page element does not indicate a web browser add-on technology, then control flows to block 305. If the web page element indicates a web browser add-on technology, then control flows to block 307.

At block 305, the element is rendered. The element rendered did not require an add-on technology container. For instance, a web browser renders text or an image.

At block 307, it is determined if the web browser add-on technology container is currently instantiated. For example, a web browser determines whether a container for a video has already been instantiated. If the add-on technology container is not currently instantiated, then control flows to block 309. If the add-on technology container is currently instantiated, then control flows to block 313.

At block 309, the web browser add-on technology container is instantiated. For instance, a web browser instance can invoke an Adobe Flash player™. The web browser can instantiate an interpreter or compiler to interpret or compile code.

At block 311, a technology container state structure is updated. The web browser instance updates the technology container state structure to indicate that the add-on technology container is currently instantiated. When an add-on technology container is terminated, the technology container state structure is updated accordingly. Embodiments are not required to maintain a structure to indicate state of add-on technology containers. Embodiments can leverage operating system facilities to determine whether an add-on technology container is currently instantiated. Although not represented in FIG. 3, embodiments are not limited to relying on a single instance of an add-on technology container, and can also instantiate an add-on technology container multiple times.

At block 313, the web page element is rendered with the web browser add-on technology container instance. For instance, the web browser instance passes content for a video to an instantiated video player container. The video player container then plays the video.

At block 315 loop control ends. If the web page source includes another web page element, then control flows back to block 301. Otherwise, the flow ends.

After a web page is rendered and the add-on technology containers are instantiated, the web page and add-on technology containers can respond to events and perform operations accordingly. As illustrated in FIG. 1, an event queue manager is instantiated to manage an event queue for the web browser instance. Local events (e.g., events generated from add-on technology containers or from the host device) and remote events (e.g., events from bonus games, community games, casino events, etc.) are stored in the event queue. Add-on technology containers, a configuration process, and the web browser instance itself can register interest in types of events and sources of events. For instance, an add-on technology container can register with the event queue manager an interest in all events or particular types of events from a specific bonus games. As an example, a configuration process can register an interest in all configuration type of events regardless of the source. As another example, multiple add-on technology containers can register an interest in wagering game events. The event queue manager can multicast a wagering game event to the multiple add-on technology containers. When each of the add-on technology containers consume the event, they each perform corresponding operations. To illustrate, a spin game event is communicated to a video player container, an audio player container, and a TM Java virtual machine container. The video player container plays a reel spin video in response to the event. The audio player container plays sound effects based on player history and the reel spin. The Java virtual machine executes code that changes a control panel to depict a pressed spin button.

The event queue manager can also perform operations to maintain the event queue beyond reporting or communicating events to entities. The event queue manager can accumulate or aggregate events and store a single data item that represents an accumulation or aggregation of events. Entities can use operating system inter-process communications facilities to learn of events of interest. Entities can also register with the event queue manager for direct communication of events. In other words, whether local or remote, the event queue manager can communicate an event directly to a process. In case of conflicts, the event queue manager can also enforce prioritization among registered processes for direct communication. For instance, the event queue manager may only communicate event A to the construction process even though both the construction process and an add-on technology container are registered for direct communication, assuming the web page construction process has a higher priority than the add-on technology container.

Figure 4:
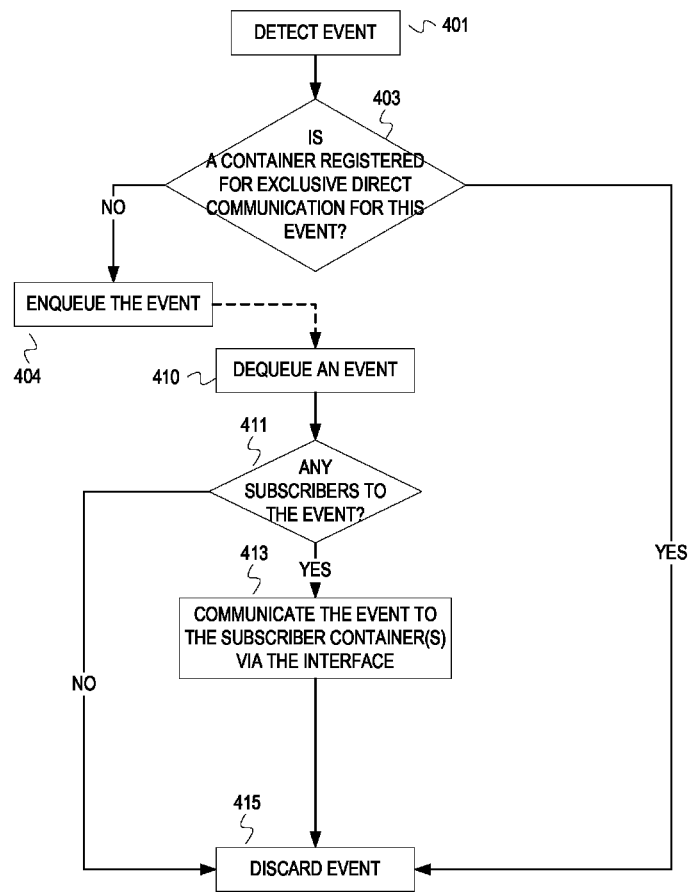
FIG. 4 depicts a flowchart of example operations for communicating events to registered containers.

FIG. 4 depicts a flowchart of example operations for communicating events to registered containers. At block 401, an event is detected. For instance, a web browser instance receives an event from a wagering game server. A web browser can also detect an event generated by any one of the web browser instance, an add-on technology container, a configuration process, and the host device/machine.

At block 403, it is determined if a container is registered for exclusive direct communication. If a container is registered for direct communication of the event, then control flows to block 415. In the case of direct communication, then the event should be communicated to the registered container without action being taken by the event queue manager. Hence, the event queue manager should be able to discard the event. A container, however, may not be registered for exclusive direct communication. In other words, other containers can be subscribed to an event even though another container has registered for direct communication. One example of this scenario would be if a first technology container needs to quickly exchange messages with the process or application that generates the event. Meanwhile, a second and third technology container update their state based on the event, but without replying to the process or application that generates the event. If a container is not registered for exclusive direct communication of the event, then control flows to block 404.

At block 404, the event is enqueued. An event can be a message, data unit, object, etc. The event can contain and/or reference one or more pieces of data. Examples of the pieces of data include an event type (e.g., wagering game event, bonus game event, hospitality event, etc.), time of the event, source of the event (e.g., a particular bonus game, a network address of a server, etc.), data type (e.g., integer, float, string, defined class, etc.), and attributes of the event (e.g., amount wagered, amount won, cost of a beverage, a receipt, a virtual asset, etc.).

At block 410, an event is dequeued. The dequeued event may or may not be the event enqueued at block 404. The event queue manager can manage the event queue in accordance with a variety of techniques. The event queue manager can comprise a first set of one or more threads or processes to perform enqueue operations and a second set of one or more threads or processes to perform dequeued operations. The event queue manager can also switch back and forth between enqueue and dequeued operations.

At block 411, it is determined if there are any subscribers to the event. If there are no subscribers to the event, then control flows to block 415. If there are subscribers to the event, then control flows to block 413.

At block 413, the event is communicated to the subscriber container(s) via the corresponding interface(s). For example, the event queue manager calls a method or function defined by the interface that passes the data (e.g., a packet) to the subscriber container. As another example, the event queue manager could pass a reference to the event data via the interface.

At block 415, the event is discarded. The event queue manager can mark the event for removal to a heap, deletion, etc. The event queue manager or an associated process can log detection and/or discard of events.

Although FIG. 4 depicts enqueue and dequeue, embodiments can depart from the depicted ordering. An event queue manager can enforce prioritization among either or both of registrants and events. For instance, events can regularly be stored in a FIFO order. But the event queue manager can evaluate each event to determine whether the event should be placed higher within the event queue, or even whether the event should be communicated immediately without queuing.

FIG. 4 also was limited to depicting event consumption by technology containers. Events can also be consumed by a configuration process. Although earlier examples illustrated the initial web page source construction, the configuration process can further alter a web page source after the initial build up. Various events can trigger a configuration process to add, remove, replace, and modify web page elements. For example, a player may wish to swap out wagering games. The new wagering game may use a different technology container than the one being swapped out, while using the same technology containers for the hospitality services menu and for an ongoing bonus game.

Figure 5:
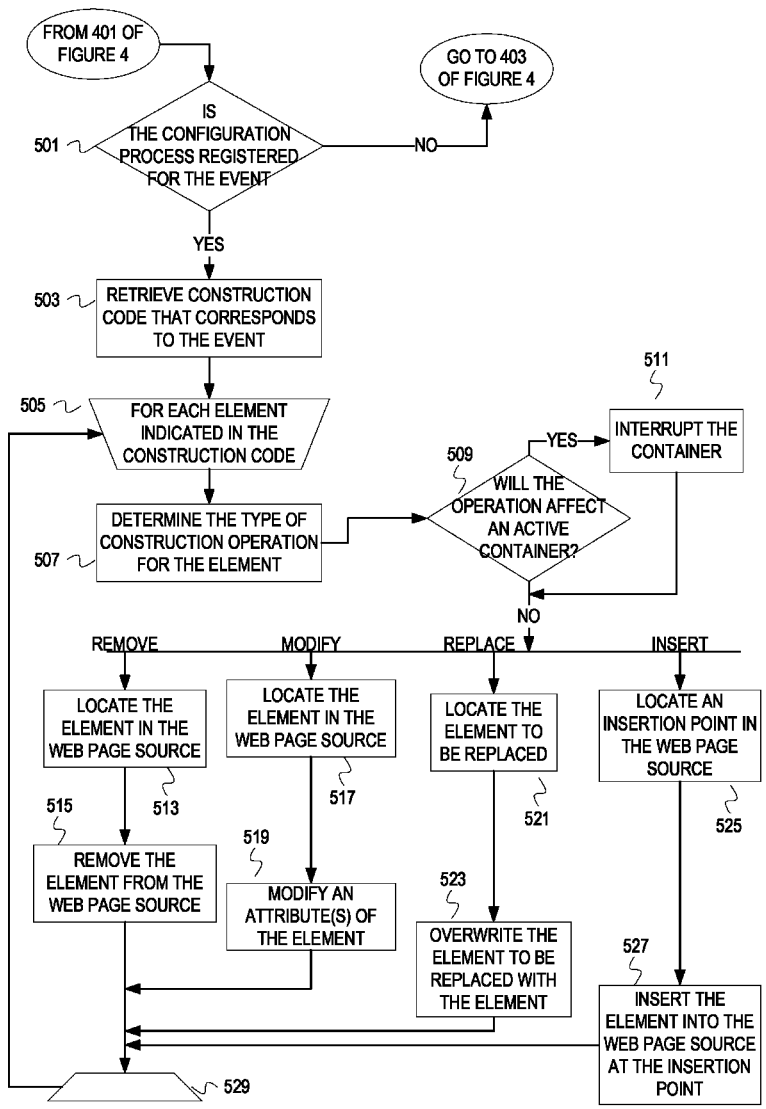
FIG. 5 depicts a flowchart of example operations for additional construction on a web page source.

FIG. 5 depicts a flowchart of example operations for additional construction on a web page source. The example operations of FIG. 5 are predicated on the assumption that events trigger additional constructions. For instance, a change in a bonus game or a win can trigger construction operations. Control is depicted as flowing from block 401 of FIG. 4 to block 501 of FIG. 5. At block 501, it is determined if a configuration process is registered or subscribed to the event. If the configuration process is registered for the event, then control flows to block 503. If not, then control flows to block 403 of FIG. 4.

At block 503, construction code that corresponds to the event is retrieved. The construction code can be retrieved from a local or remote store. The constructions code can be retrieved based on information indicated by the event. For examples, the construction can be retrieved based on anyone of an event type, an event code, a source of the event, and a reference to the construction code in the event. The configuration process may wait for a bonus game event that indicates the bonus game has been concluded. The construction for that bonus game event may require construction of a new bonus game web page element or tearing down of the web page element(s) that correspond to the bonus game, At block 505, loop of operations begins for each element indicated in the retrieved construction code. In this example flowchart, the loop of operations includes operations to determine state of a relevant technology container and operations to implement the construction.

At block 507, the type of construction operation for the web page element is determined. For example, it is determined whether the construction code calls for removing the web page element, modifying the web page element, replacing the web page element, or inserting the web page element.

At block 509, it is determined if the operation will affect an active technology container. For instance, an add-on technology container may be operating upon the web page element. For the configuration process to modify the web page element, the add-on technology container may be suspended or terminated. If the construction operation will affect an active container, then control flows to block 511. If the construction operation will not affect an active container, then control flows to one of blocks 513, 517, 521, and 525.

At block 511, the active container is interrupted. For instance, a configuration process submits a request to an operating system to terminate the active container. As another example, the configuration process submits a request to the active container for the active container to enter a pause or stall type of state. The active container can then inform the configuration process when it has entered a state of not, at least, writing data corresponding to the web page element, and wait until a notification from the configuration process allows the paused/stalled active container to resume or begin accessing data corresponding to the web page element. The configuration process can also request the active container to terminate itself, instead of requesting through the operating system. An active container may not be affected by a construction operation if the active container does not operate upon any data corresponding to the web page element; if the active container is currently operating upon data that is independent of the web page element, and the construction operation will complete beforehand; etc.

If the construction operation is a remove type of construction operation, then control flows to block 513. At block 513, the web page element being removed from the web page source is located. For example, the configuration process searches for a particular tag or string of the web page element.

At block 515, the web page element is removed from the web page source. For instance, the configuration process can make a copy of the web page source. The configuration process can then remove the web page element from the copy of the web page source, which will replace the web page source. In another example, the configuration process clears a memory space that hosts the web page element after clearing any references or dependencies upon the data in that memory space.

Control flows from block 515 to block 529, which determines whether the loop ends. If there are additional web page elements, then control flows from the block 529 back to block 505. If there are no additional web page elements, then the flow ends at block 529.

If the construction operation is a modify type of construction operation, then control flows to block 517. At block 517, the web page element is located in the web page source.

Then, at block 519, an attribute of the web page element is modified. For instance, the configuration process modifies a value assigned to an attribute of an object. For example, screen coordinates may be modified to resize or move an object. A drag/drop property can be modified to allow or disallow a player from moving the web page element. A value of a visibility attribute of an object or the web page element can be modified to temporarily make the object or web page element visible or not visible. Control flows from block 519 to block 529.

If the construction operation is a replace type of construction operation, then control flows to block 521. At block 521, the web page element to be replaced is located in the web page source. For instance, the configuration process indicates a web page element to be replaced and a new web page element that will replace it.

At block 523, the web page element to be replaced is overwritten with the new web page element. If the web page elements occupy different sizes of memory, then the configuration process will adjust the web page source accordingly. Control flows to block 529.

If the construction operation is a insert type of construction operation, then control flows to block 525. At block 525, an insertion is located within the web page source.

At block 527, the web page element is inserted into the web page source at the insertion point. For example, the web page source is segmented in memory. The new web page element is then appended to a first segment in memory. And then a second segment is appended to the new web page element. As another example, the new web page element is appended to the web page source and branches are inserted to direct flow of the web page source accordingly. Control flows to block 529 from block 527.

In some embodiments, the operations of FIGS. 3-5 can be performed by logic not described in the block diagrams. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Wagering Game Machine Architectures

Figure 6:
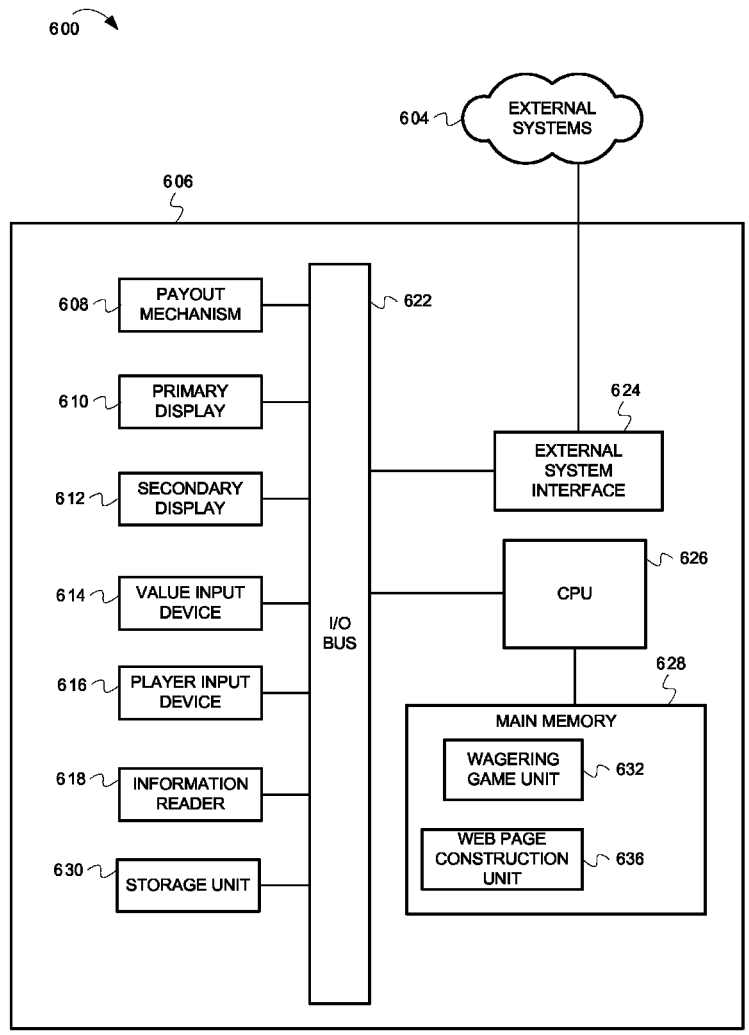
FIG. 6 is a block diagram illustrating a wagering game machine architecture, according to example embodiments of the invention.

FIG. 6 is a block diagram illustrating a wagering game machine architecture, according to example embodiments of the invention. As shown in FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632 and a web page construction unit 636. In one embodiment, the wagering game unit 632 can present wagering games, such as video poker, video black jack, video slots, video lottery, etc., in whole or part. The web page construction unit 636 performs operations that involves building up or constructing an initial web page source to include web page elements of various technologies. For instance, the web page construction unit can perform the examples operations depicted in FIG. 5.

The CPU 626 is also connected to an input/output (I/O) bus 622, which can include any suitable bus technologies, such as an AGTL+ frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks).

In one embodiment, the wagering game machine 606 can include additional peripheral devices and/or more than one of each component shown in FIG. 6. For example, in one embodiment, the wagering game machine 606 can include multiple external system interfaces 624 and/or multiple CPUs 626. In one embodiment, any of the components can be integrated or subdivided.

Any component of the architecture 600 can include hardware, firmware, and/or machine-readable media including instructions for performing the operations described herein. Machine-readable media includes any mechanism that stores ("machine-readable storage media") and/or transmits ("machine-readable signal media") information in a form readable by a machine (e.g., a wagering game machine, computer, etc.). Examples of machine-readable storage media include read only memory (ROM), random access memory (RAM), magnetic disk storage media, optical storage media, flash memory machines, etc. Examples of machine- readable signal media includes media suitable for transmitting software over a network.

While FIG. 6 describes an example wagering game machine architecture, this section continues with a discussion wagering game networks.

Wagering Game Networks

Figure 7:
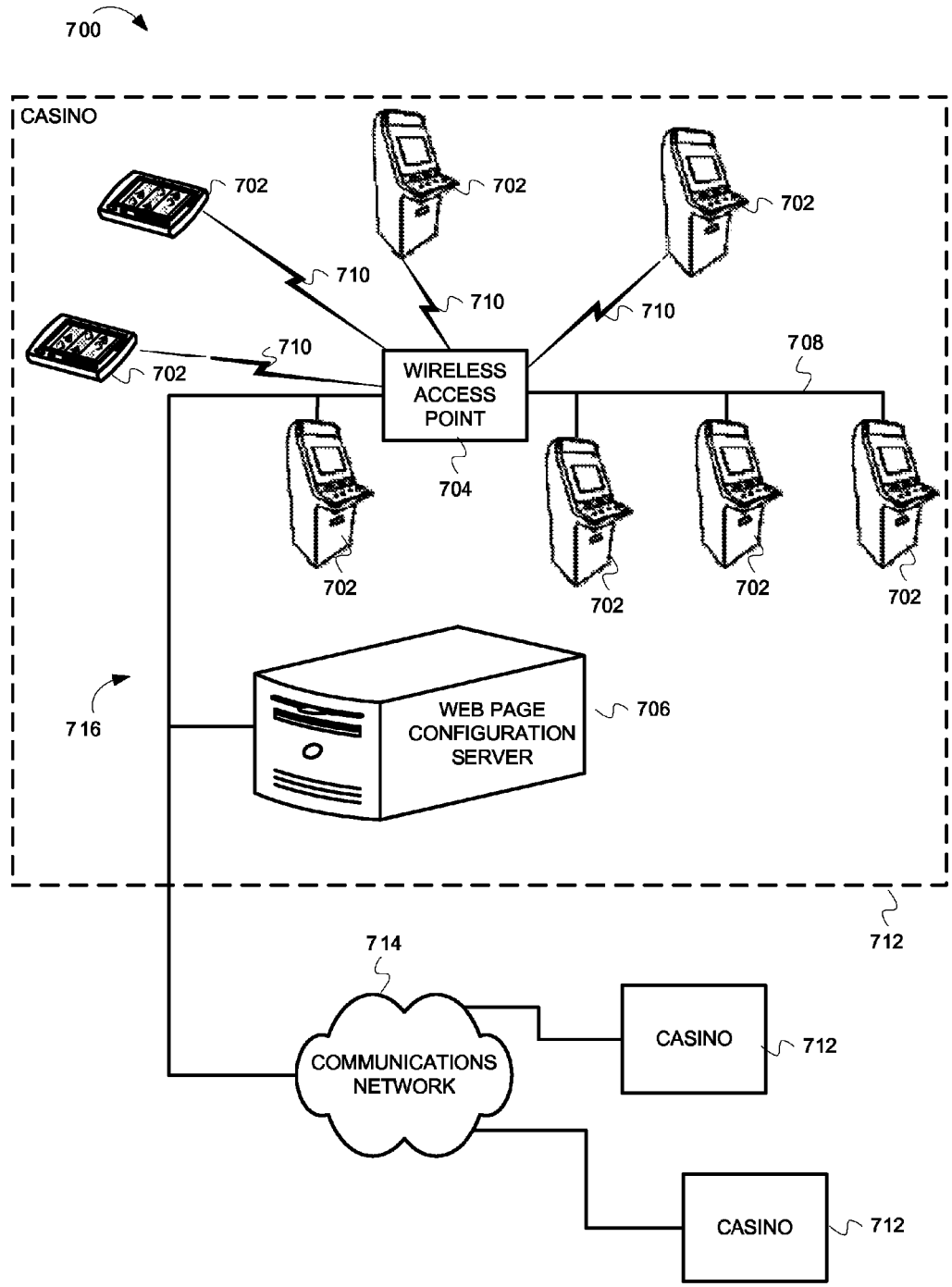
FIG. 7 is a block diagram illustrating a wagering game network 700, according to example embodiments of the invention.

FIG. 7 is a block diagram illustrating a wagering game network 700, according to example embodiments of the invention. As shown in FIG. 7, the wagering game network 700 includes a plurality of casinos 712 connected to a communications network 714.

Each casino 712 includes a local area network 716, which includes an access point 704, a web page configuration server 706, and wagering game machines 702. The access point 7304 provides wireless communication links 710 and wired communication links 708. The wired and wireless communication links can employ any suitable connection technology, such as Bluetooth, 802.11, Ethernet, public switched telephone networks, SONET, etc. The web page configuration server 706 serves configuration code to wagering games 702 that request construction code. The web page configuration server 706 can also look up various configuration codes based on information in the requests and/or environment information (e.g., casino defined variables, time of day, holiday, current convention, etc.). In some embodiments, the web page configuration server 706 can also serve wagering games and distribute content to devices located in other casinos 712 or at other locations on the communications network 714.

The wagering game machines 702 described herein can take any suitable form, such as floor standing models, handheld mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. In one embodiment, the wagering game network 700 can include other network devices, such as accounting servers, wide area progressive servers, player tracking servers, and/or other devices suitable for use in connection with embodiments of the invention.

In some embodiments, wagering game machines 702 and wagering game servers 706 work together such that a wagering game machine 702 can be operated as a thin, thick, or intermediate client. For example, one or more elements of game play may be controlled by the wagering game machine 702 (client) or the web page configuration server 706 (server). Game play elements can include executable game code, lookup tables, configuration files, game outcome, audio or visual representations of the game, game assets or the like. In a thin-client example, the web page configuration server 706 can perform functions such as determining game outcome or managing assets, while the wagering game machine 702 can present a graphical representation of such outcome or asset modification to the user (e.g., player). In a thick-client example, the wagering game machines 702 can determine game outcomes and communicate the outcomes to the web page configuration server 706 for recording or managing a player's account.

In some embodiments, either the wagering game machines 702 (client) or the web page configuration server 706 can provide additional functionality that is not directly related to serving configuration code. For example, account transactions and account rules may be managed centrally (e.g., by the web page configuration server 706) or locally (e.g., by the wagering game machine 702). Other functionality not directly related to game play may include power management, presentation of advertising, software or firmware updates, system quality or security checks, etc.

Any of the wagering game network components (e.g., the wagering game machines 702) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of creating a browser based heterogeneous technology ecosystem, the method comprising:
   loading, via a web browser, a web page source that comprises configuration code;
   executing, by the web browser, the configuration code on a machine that hosts the web browser;
   in response to said executing the configuration code,
      instantiating an event queue manager that manages an event queue responsive to said executing the configuration code, and requesting web page construction code that indicates web page elements responsive to said executing the configuration code, wherein the web page elements comprise a first web page element that corresponds to a first technology and a second web page element that corresponds to a second technology;

building up the web page source to include the web page elements in accordance with the web page construction code resulting in a built up web page source; and rendering the built up web page source, wherein said rendering the built up web page source comprises, instantiating a first add-on technology container to render the first web page element, and instantiating a second add-on technology container to render the second web page element.

2. The method of claim 1, further comprising the first add-on technology container one of executing code of the first web page element in accordance with the first technology and presenting content of the first web page element in accordance with the first technology.

3. The method of claim 2, wherein the first add-on technology container comprises one of an interpreter, a virtual machine, an audio player, an animation engine, a game engine, and a video player.

4. The method of claim 1, wherein said web page source comprises at least one of hypertext markup language and extensible markup language.

5. The method of claim 1, wherein said requesting the web page construction code that indicates the web page elements comprises generating a construction code request that indicates at least one of a construction code identifier, a wagering game identifier, a wagering game developer identifier, an operating system of a wagering game machine, and information about the web browser.

6. The method of claim 1 further comprising:

receiving a request that indicates an operation for the first web page element of the web page source;

performing the operation on the first web page element, wherein the operation comprises one of removing, modifying, and replacing; and rendering the web page source after said performing the operation on the first web page element completes.

7. The method of claim 6 further comprising:

terminating the first add-on technology container prior to said performing the operation on the first web page element, wherein said rendering the web page source after said performing the operation on the first web page element completes comprises re-instantiating the first add-on technology container.

8. The method of claim 6 further comprising:

suspending the first add-on technology container prior to performing the operation on the first web page element, wherein said rendering the web page source after said performing the operation on the first web page element completes comprises resuming the first add-on technology container.

9. The method of claim 1 further comprising:

receiving a request that indicates an operation to insert a new web page element into the web page source, wherein the new web page element corresponds to the first technology;

one of terminating and suspending the first add-on technology container;

inserting the new web page element into the web page source; and rendering the web page source with the inserted new web page element, wherein said rendering the web page source with the inserted new web page element comprises restoring the first add-on technology container to render the new web page element.

10. One or more non-transitory computer readable storage media, having instructions stored therein, which, when executed by one or more processors, causes the one or more processors to perform operations that comprise: loading, via a web browser, a web page source that comprises configuration code; executing the configuration code; instantiating an event queue manager that manages an event queue responsive to said executing the configuration code; requesting web page construction code that indicates web page elements responsive to said executing the configuration code, wherein the web page elements comprise a first web page element that corresponds to a first technology and a second web page elements that corresponds to a second technology; building up the web page source to include the web page elements in accordance with the web page construction code resulting in a built up web page source; and rendering the built up web page source, wherein said rendering the built up web page source comprises, instantiating a first add-on technology container to render the first web page element, and instantiating a second add-on technology container to render the second web page element.

11. The one or more non-transitory computer readable storage media of claim 10, further comprising the first add-on technology container one of executing code of the first web page element in accordance with the first technology and presenting content of the first web page element in accordance with the first technology.

12. The one or more non-transitory computer readable storage media of claim 11, wherein the first add-on technology container comprises one of an interpreter, a virtual machine, an audio player, an animation engine, a game engine, and a video player.

13. The one or more non-transitory computer readable storage media of claim 10, wherein said web page source comprises at least one of hypertext markup language and extensible markup language.

14. The one or more non-transitory computer readable storage media of claim 10, wherein said requesting the web page construction code that indicates the web page elements comprises generating a construction code request that indicates at least one of a construction code identifier, a wagering game identifier, a wagering game developer identifier, an operating system of a wagering game machine, and information about the web browser.

15. The one or more non-transitory computer readable storage media of claim 10, the operations further comprising: receiving a request that indicates an operation to insert a new web page element into the web page source, wherein the new web page element corresponds to the first technology; one of terminating and suspending the first add-on technology container; inserting the new web page element into the web page source; and rendering the web page source with the inserted new web page element, wherein said rendering the web page source with the inserted new web page element comprises restoring the first add-on technology container to render the new web page element.

16. An apparatus comprising:

at least one processor; and, a computer readable storage medium having computer usable code executable on the at least one processor, the computer usable code including code to:

load a web page source that comprises configuration code;

execute the confirmation code;

instantiate an event queue manager that manages an event queue responsive to said execution of the confirmation code;

request web page construction code that indicates web page elements responsive to said execution of the confirmation code, wherein the web page elements comprise a first web page element that correspond to a first technology and a second web page elements that correspond to a second web page technology;

build up the web page source to include the web page elements in accordance with the web page construction code resulting in built up web page source; and render the built up web page source wherein said code to render the built up web page source comprises code to
 instantiate a first add-on technology container to render the first web page element, and
 instantiate a second add-on technology container to render the second web page element.

17. The apparatus of claim 16, further comprising code to:
 cause the first add-on technology container to one of execute code of the first web page element in accordance with the first technology and present content of the first web page element in accordance with the first technology.

18. The apparatus of claim 16, wherein the first add-on technology container comprises one of an interpreter, a virtual machine, an audio player, an animation engine, and a video player.

19. The apparatus of claim 16, wherein said web page source comprises at least one of hypertext markup language and extensible markup language.

20. The apparatus of claim 16, wherein the code to request the web page construction code that indicates the web page elements comprises code to generate a construction code request that indicates at least one of a construction code identifier, a wagering game identifier, a wagering game developer identifier, an operating system of a wagering game machine, and information about a web browser.

* * * * *